United States Patent

Hori

Patent Number: 5,678,084
Date of Patent: Oct. 14, 1997

[54] DATA RECORDING APPARATUS FOR CAMERA

[75] Inventor: Masakatsu Hori, Tokyo, Japan

[73] Assignee: Asahi Kogaku Kogyo Kabushiki Kaisha, Tokyo, Japan

[21] Appl. No.: 423,376

[22] Filed: Apr. 18, 1995

[30] Foreign Application Priority Data

Apr. 20, 1994 [JP] Japan ................... 6-081945
Apr. 20, 1994 [JP] Japan ................... 6-081946

[51] Int. Cl.$^6$ .............................. G03B 17/24
[52] U.S. Cl. ..................... 396/317; 396/318
[58] Field of Search .................... 354/106, 159; 396/315, 316, 317, 318

[56] References Cited

U.S. PATENT DOCUMENTS

| | | |
|---|---|---|
| 5,003,329 | 3/1991 | Itabashi . |
| 5,307,111 | 4/1994 | Kurei . |
| 5,349,402 | 9/1994 | Soshi et al. ............... 354/106 |
| 5,389,989 | 2/1995 | Hawkins et al. ........... 354/106 |
| 5,389,991 | 2/1995 | Naka et al. ............... 354/159 |
| 5,469,237 | 11/1995 | Itoh et al. ................ 354/106 |
| 5,473,397 | 12/1995 | Miyamoto et al. ......... 354/106 |

FOREIGN PATENT DOCUMENTS 5-88246  4/1993  Japan .

*Primary Examiner*—David M. Gray
*Attorney, Agent, or Firm*—Greenblum & Bernstein P.L.C.

[57] ABSTRACT

A data recording apparatus for a camera includes a data module having a plurality of light emitting elements. The data module also includes a plurality of image forming optical systems which form images of bundles of light emitted from the data module on a film at different recording positions. The image forming optical systems comprise a single prism to refract light paths of the bundles of light.

25 Claims, 8 Drawing Sheets

DATA RECORDING APPARATUS FOR CAMERA

BACKGROUND OF THE INVENTION

1. Field of the Invention

The present invention relates to an apparatus for recording photographic data, such as a photographing date, on a photographing film in a camera.

2. Description of the Related Art

In a known camera having a data recording apparatus, a plurality of light emitters, such as LED's, are selectively activated to emit light, so that a bundle of light is converged on a film through a converging optical system to record photographic data, such as a photographing date and a time at which a picture taken, which are recorded on the film.

In such a known camera, a data module comprised of light emitters is provided on a substrate disposed in the vicinity of an aperture of the camera. To this end, it is necessary to provide a space large enough to accommodate the substrate near the aperture. This results in an increased size of the camera, and particularly the size in the lateral direction thereof (i.e., travelling direction of the film in which the film moves on the aperture).

Moreover, in a known camera having at least two picture plane sizes (which refer to a print size), i.e., a standard 35 mm size and a panoramic size of 13 mm×36 mm), photographic data must be recorded on the film at different recording positions of the film (which are usually located at the lower right corner of the print), depending on the print size. To this end, it is necessary to provide one optical system for each recording position in a conventional camera. This results in an increased number of components, a complicated assembly, and the need for a larger space for accommodating the optical systems, thereby leading to increased manufacturing costs of a camera.

SUMMARY OF THE INVENTION

The primary object of the present invention is to provide a compact data recording apparatus which can be incorporated in a camera substantially without making the camera large.

Another object of the present invention is to provide an inexpensive data recording apparatus for a camera in which there are fewer components the assembly is simplified, and a large accommodation of space for the components is not necessary.

According to a first aspect of the present invention, there is provided a data recording apparatus for a camera, including a data module having a plurality of light emitting elements, and a plurality of image forming optical systems which form images of bundles of light emitted from the data module on a film at different recording positions. The image forming optical systems include of a single common prism for refracting the light paths of the bundles of light.

According to a second aspect of the present invention, there is provided a data recording apparatus for a camera with a spool compartment, including a data module having a plurality of light emitting elements, image forming optical systems which form images of bundles of light emitted from the data module on a film, and a data recording light path defined between the spool compartment of the camera and a photographing light path of the camera and extending substantially parallel with an optical axis of the camera. The data recording light path partially faces a film surface at one end thereof, the data module being located at the other end of the data recording light path.

According to still another aspect of the present invention, there is provided a data recording apparatus for a camera, including a single data module having a plurality of light emitting elements, a plurality of image forming optical systems which form images of bundles of light emitted from the data module on a film at different recording positions, a light intercepting mechanism provided for each image forming optical system for selectively intercepting the light paths or paths defined between the data module and the film, and a selecting mechanism for selectively opening a light path for the selected one light intercepting mechanism and closing and intercepting a light path or paths for the remaining light intercepting mechanism.

With the arrangement of the first aspect of the invention, since the single prism is commonly used for the image forming optical systems, an inexpensive data recording apparatus to record photographic data on a film at different recording positions can be obtained, wherein there are fewer components, the assembly operation is simplified, and a large accommodation of space for the components is not necessary. Moreover, the integral formation of the lens surfaces on the incident surface and the emission surface of the prism makes it possible to form images of the data module on the film at different magnifications.

With the arrangement of the second aspect of the invention, the data recording light path extending substantially parallel with the optical axis of the camera is provided between the spool compartment of the camera and the photographing light path, and the data recording light path faces at one end thereof the film surface and is provided on the other end thereof with the data module. Consequently, the data recording apparatus can be incorporated in the camera without increasing the size of the camera.

The present disclosure relates to subject matter contained in Japanese Patent Application Nos. 6-81945 and 6-81946 (both filed on Apr. 20, 1994) which are expressly incorporated herein by reference in their entireties.

BRIEF DESCRIPTION OF THE DRAWINGS

The invention will be described below with reference to the accompanying drawings, in which.

DESCRIPTION OF THE PREFERRED EMBODIMENT

Figure 3:
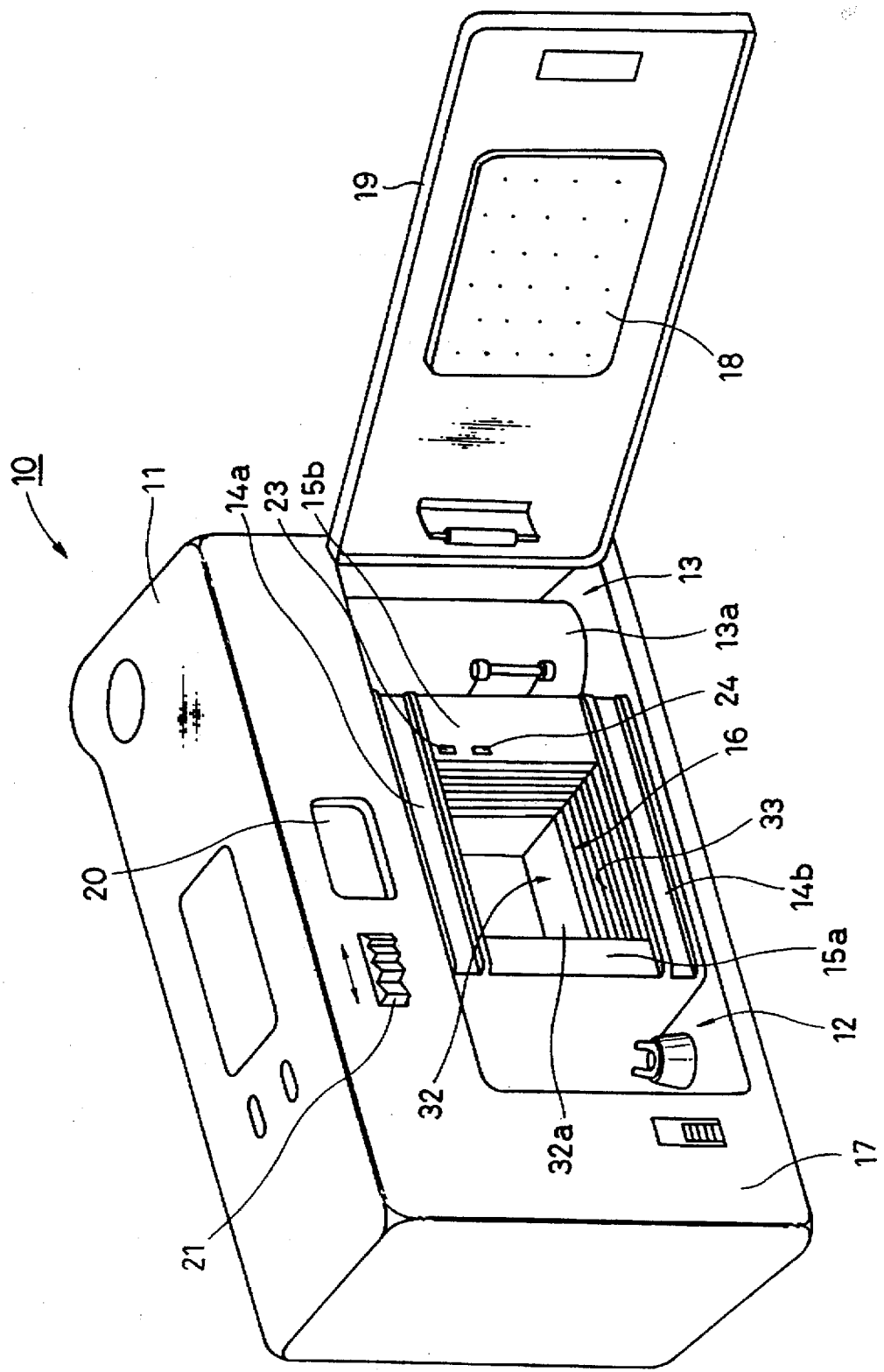
FIG. 3 is a back perspective view of a camera to which the present invention is applied.

FIG. 3 shows a camera 10 having a data recording apparatus according to the present invention. The camera 10 has a picture plane size selecting mechanism which selects one of two picture plane sizes of standard 35 mm size and a panoramic size of 13 mm×36 mm. When the standard size or the panoramic size are selected, a predetermined pattern of a bundle of light emitted from a data module 38 see FIG. 1 comprising of a plurality of light emitters or light emitting diodes (LED) 37 is converged onto a film at different recording positions, depending on the selected picture plane size, through a hole 23 formed in the vicinity of an aperture 16 and through a hole 24, respectively.

The present invention can also be applied to recent cameras in which recording area data is recorded on the film without varying the area of the film to be exposed, upon switching the picture plane size. In this application, a picture plane size selecting mechanism which is provided to vary the area of the film to be exposed in the illustrated embodiment, as discussed below, is unnecessary.

The camera 10 has a camera body 11 which is provided on the right and left sides thereof with a film cartridge (patrone) compartment 12 and a spool compartment 13 having a spool 13a. Between the film cartridge compartment 12 and the spool compartment 13 is an aperture 16 which is defined by a pair of upper and lower aperture frames 14a and 14b and a pair of right and left aperture frames 15a and 15b. The camera body 11 is provided on the rear wall 17 thereof with a back cover 19 which has a film pressing plate 18 and which is hinged to one end of the rear wall 17 for opening and closing the rear compartment. There is provided an ocular portion 20 of a finder on the upper center portion of the rear wall 17 of the camera body 11. A sliding switch (actuating member) 21 is provided on the rear wall 17 on the left side of the aperture 20 in FIG. 3. The sliding switch 21 is slid in the lateral direction (right and left directions in FIG. 3) to switch the picture plane size (print size) between a standard size and a panoramic size.

The aperture frame 15b adjacent to the spool compartment 13 is provided with the holes 23 and 24. Holes 23 and 24 are located at the upper right corner of the aperture frame 15b in FIG. 3 and are aligned in the vertical direction between the aperture 16 and the spool compartment 13.

Figure 1:
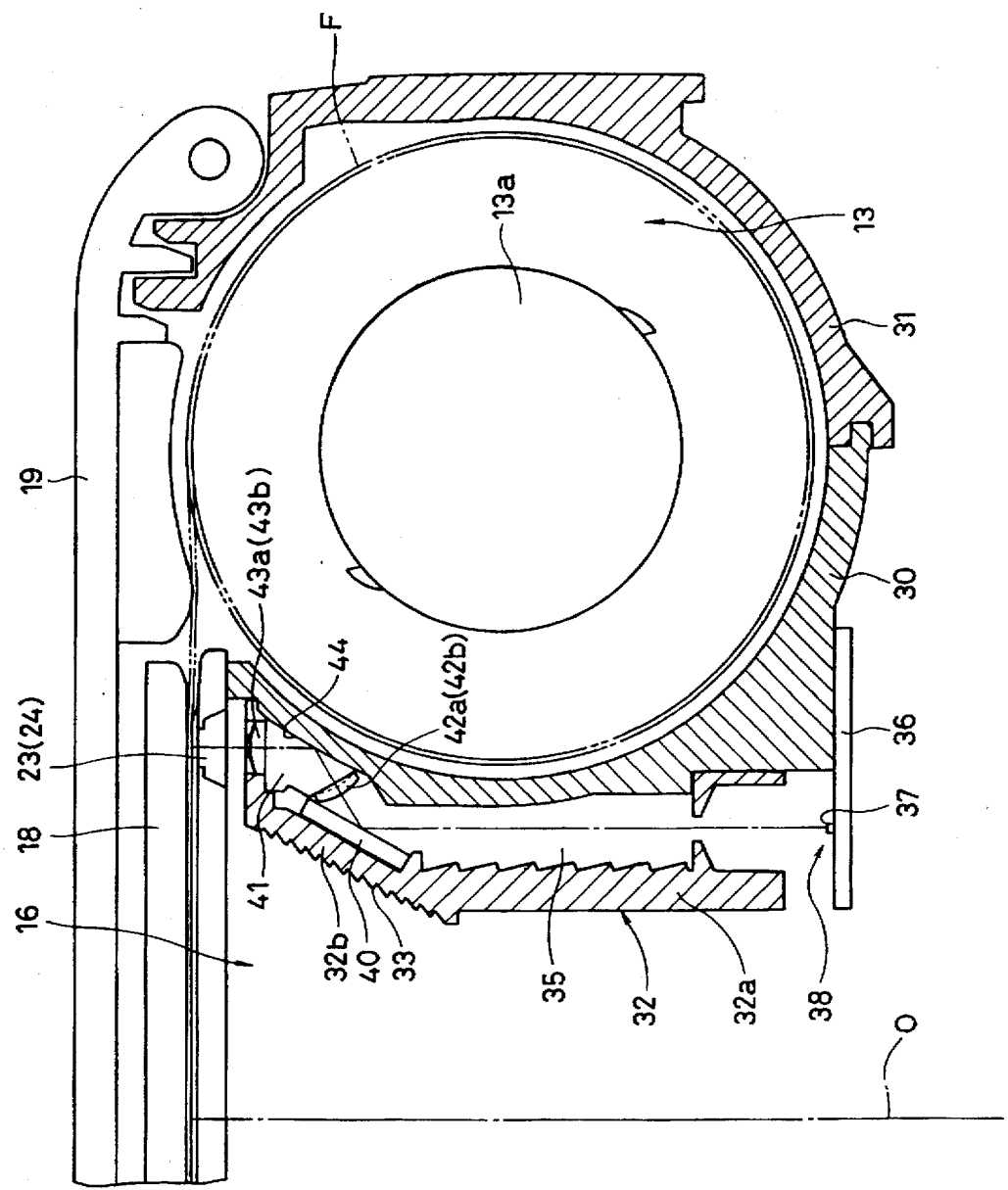
FIG. 1 is a sectional view of a main part of a data recording apparatus for a camera, to which the present invention is applied.

As can be seen in FIG. 1, the side wall of the spool compartment 13 is formed by two spool compartment forming mold halves 30 and 31 located close to and away from the aperture 16, respectively. The mold halves 30 and 31 are secured to the camera body 11.

The inner side wall surface of the aperture 16 is defined by a photographing light intercepting cylinder 32 having a generally rectangular cross section.

The intercepting cylinder 32 includes of a front half 32a having four parallel plates lying in planes substantially parallel with the photographing optical axis O and a rear half 32b connected to the front half 32a and having four plates inclined with respect to the optical axis O to define a space expanding towards the film F on the film pressing plate 18. The intercepting cylinder 32 defines the photographing optical path including the optical axis O. The rear half 32b is provided on the inner peripheral surface with an anti-reflection surface 33 made of micro-projections and depressions.

A data recording light path 35 extending substantially parallel with the optical axis O is defined between the spool compartment forming mold half 30 and the intercepting cylinder 32. The data recording light path 35 has a length substantially identical to the diameter of the spool compartment 13. A substrate 36 is secured to the spool compartment forming mold half 30 at the front end (lower end in FIG. 1) of the data recording light path 35. The rear end of the data recording light path 35 faces the film F on the film pressing plate 18.

The substrate 36 (also see FIG. 2) is provided, on the surface facing the data recording light path 35, with a data module 38 mounted thereon, including seven LED's 37 which are aligned in the direction perpendicular to the travelling direction of the film F. The data module 38 emits a bundle of light (a predetermined pattern of light) which forms photographic data to be recorded on the film F. The bundle of light emitted from the data module 38 is transmitted through mirror (reflecting surface) 40 and prism 41 and reaches the film F through the holes 23 and 24.

The mirror 40 is secured to the side surface of the rear half 32b opposite to the anti-reflection surface 33 to reflect the light (pattern light) emitted from the data module 38 toward the prism 41. The prism 41 is located close to the mirror 40, so that the pattern light reflected by the mirror 40 is converged onto the film F through the holes 23 and 24.

Figure 2:
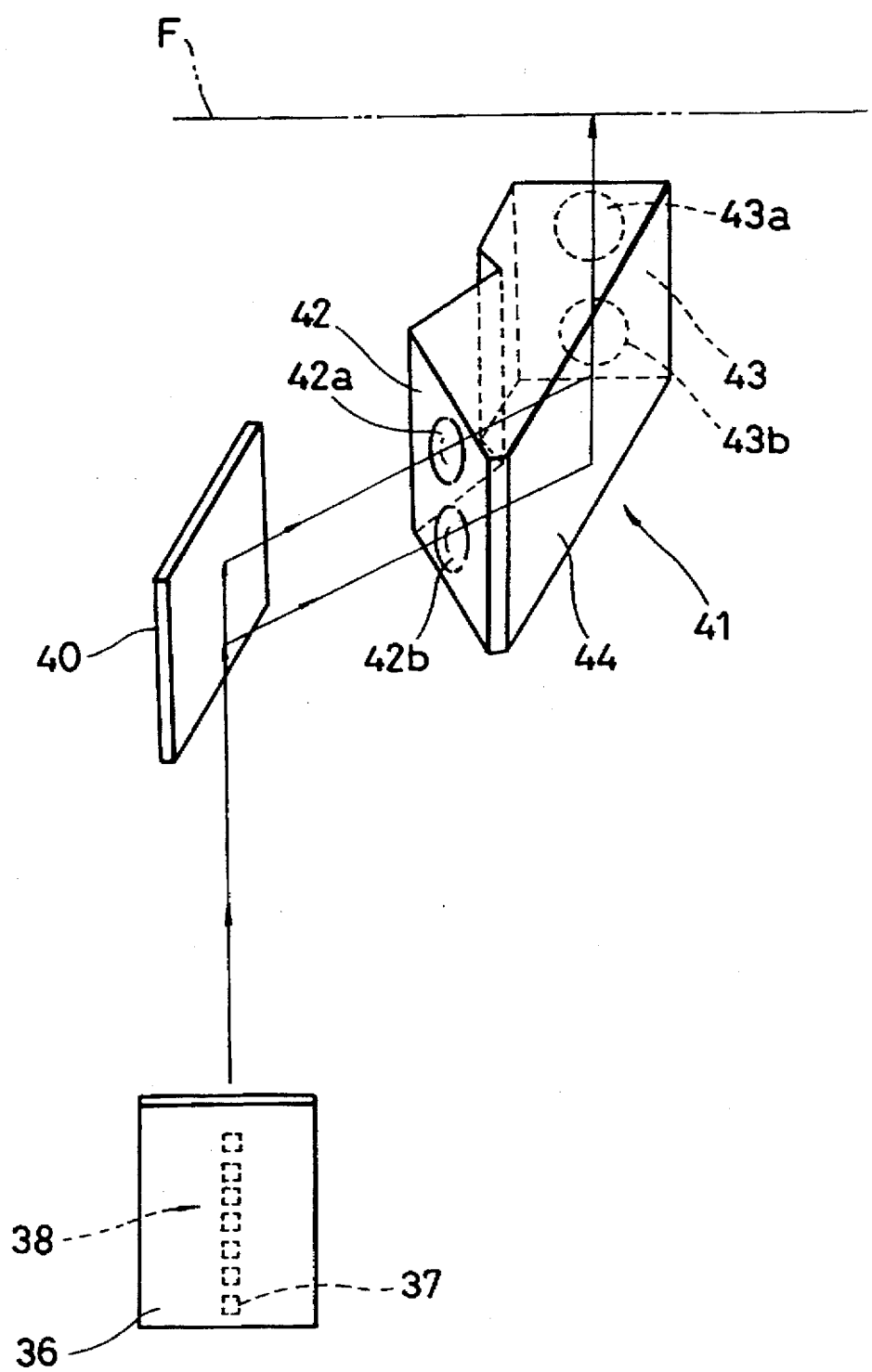
FIG. 2 is a schematic view of a data module, a mirror and a prism in the data recording apparatus shown in FIG. 1.

As can be seen in FIG. 2, the prism 41 has an incident surface 42 and an emitting surface 43. The incident surface 42 is provided with a pair of lens surfaces 42a and 42b juxtaposed in the vertical direction (i.e., direction perpendicular to the travelling direction of the film F). The emitting surface 43 is provided with a pair of lens surfaces 43a and 43b juxtaposed in the vertical direction. The prism 41 also has a prism surface (reflecting surface) 44 which totally reflects the pattern light incident upon the lens surfaces 42a and 42b toward the lens surfaces 43a and 43b.

The lens surfaces 42a and 43a converge a part of the light reflected by the mirror 40 onto the film F through the hole 23. The lens surfaces 42b and 43b converge a part of the pattern light reflected by the mirror 40 onto the film F through the hole 24. Namely, the prism 41 has two image forming optical systems to make the pattern light incident upon the film F at two different recording positions. One of the two image forming optical systems is comprised of the lens surface 42a, the prism surface 44, and the lens surface 43a, and the other image forming optical systems is comprised of the lens surface 42b, the prism surface 44, and the lens surface 43b. Thus, identical images of the same photographic data are formed on the portions of the film F that correspond to the holes 23 and 24, respectively.

The lens surfaces 42b and 43b are constructed such that the image of the photographic data to be formed on the film F by the lens surfaces 42b and 43b is slightly smaller than the image of the photographic data to be formed on the film F by the lens surfaces 42a and 43a, taking into account a balance in size between the picture plane on the film F and the image of the photographic data to be recorded in the picture plane. Namely, it is preferable that the image of the photographic data to be recorded within the panoramic picture plane is smaller than the image of the photographic data to be recorded within the standard picture plane.

Figure 7:
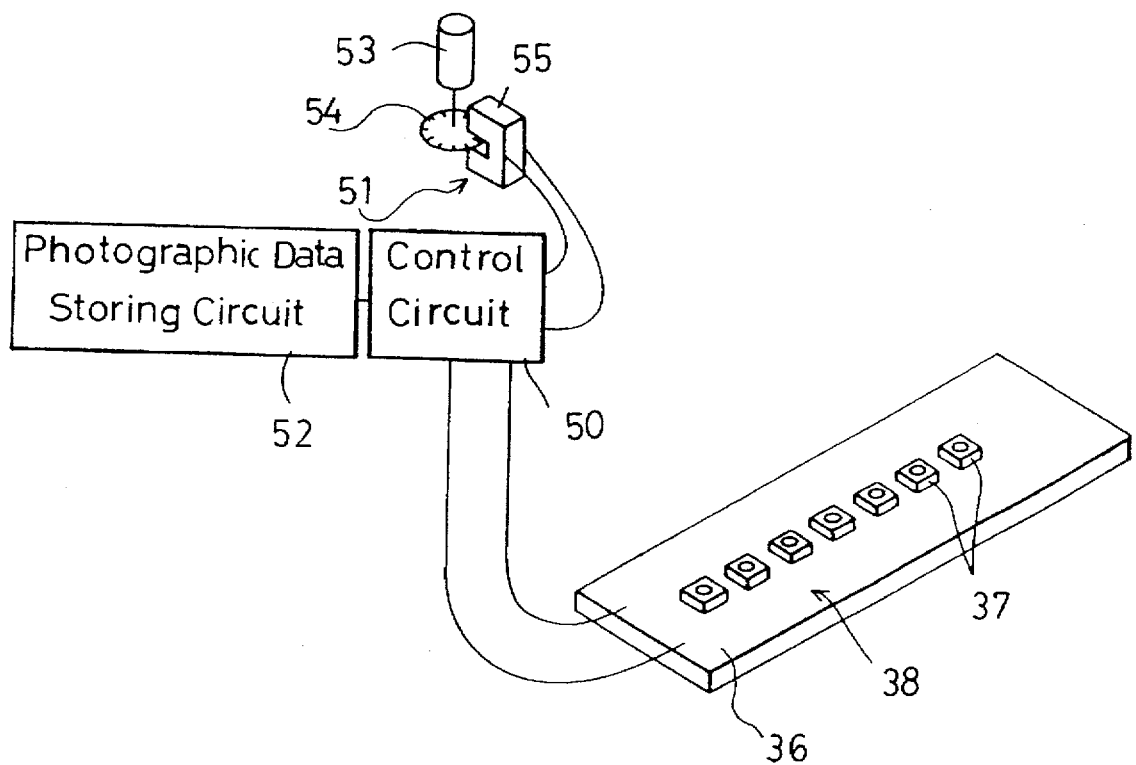
FIG. 7 is a block diagram of a control system for a data module, a pulse generator, and its surrounding components; and, FIG. 8 is a front elevational view of photographic data to be recorded on a film, by way of example.

The emission timing of the LED's 37 of the data module 38 is controlled by a control circuit (controller) 50 (FIG. 7). Data is supplied to the controller 50 from a pulse generator 51 which generates pulses in accordance with the movement of the film F and a photographic data storing circuit 52. The pulse generator 51, comprises a light intercepting disc 54 coaxial to a counter roller 53 which rotates in synchronization with the movement of the film F and a photocoupler 55, to generate pulses in accordance with the movement of the film F. Consequently, the controller 50 causes the LED's 37 to emit a predetermined pattern of a bundle of light at a predetermined timing corresponding to the photographic data to be recorded, in accordance with the movement of the film F upon completion of the photographing operation for one frame.

The camera 10 is provided with a picture plane size selecting mechanism comprised of a pair of light intercepting plates 61 and 62 that are retractably moved into the photographing light path to restrict the picture plane even after the film F is loaded. Namely, the standard size and the panoramic size can be selectively set by the picture plane size selecting mechanism. When the sliding switch 21 is laterally slid in one direction, the light intercepting plates 61 and 62 are translated in parallel proximity to each other to define the panoramic picture plane (indicated by the two-dotted and dashed line in FIG. 4). When the sliding switch 21 is laterally slid in the other direction, the light intercepting plates 61 and 62 are translated in parallel away from one another to define the standard picture plane (indicated by the solid line in FIG. 4). The sliding switch 21 is associated with the light intercepting plates 61 and 62 by a well known association mechanism (not shown).

Figure 5:
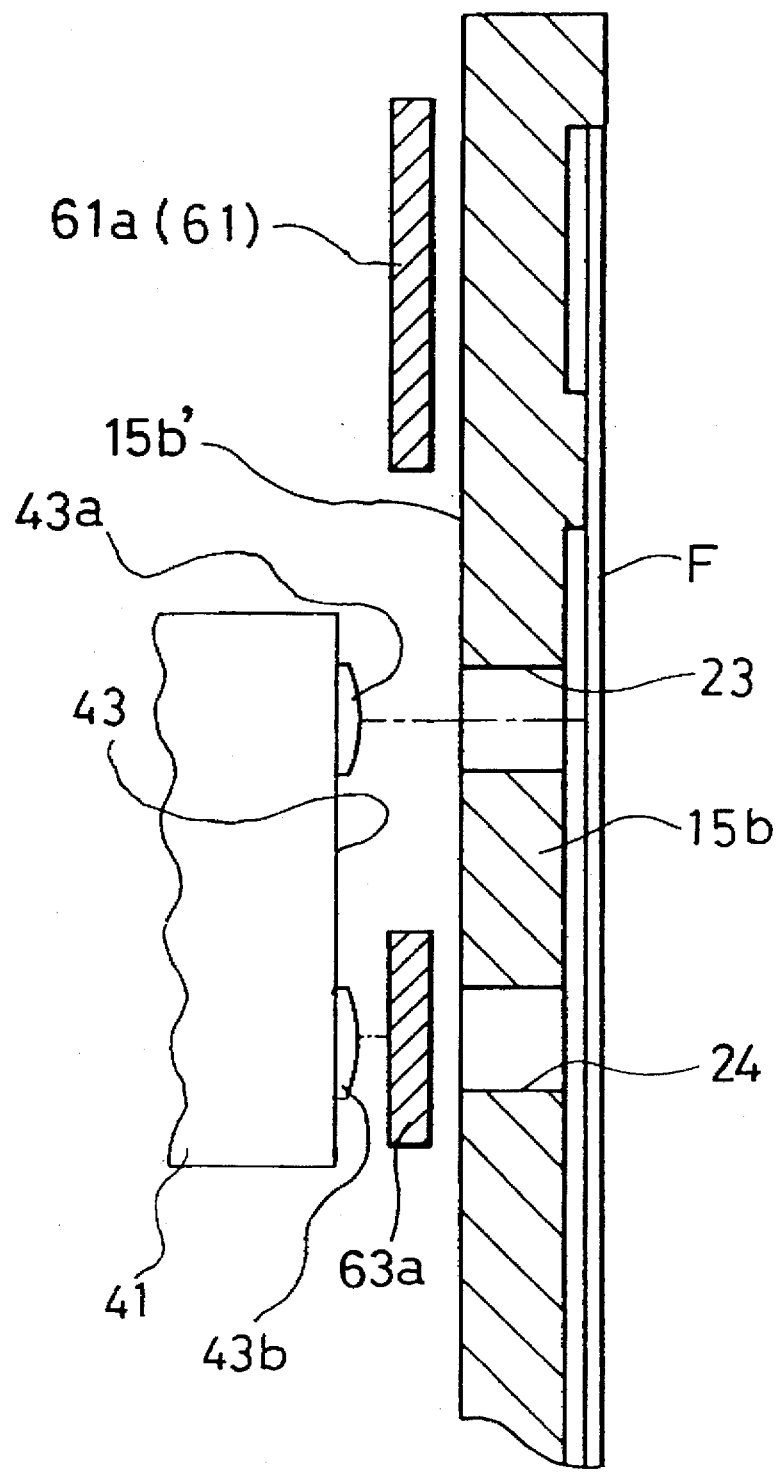
FIG. 5 is an enlarged sectional view of a main part of a data recording apparatus according to the present invention.
Figure 6:
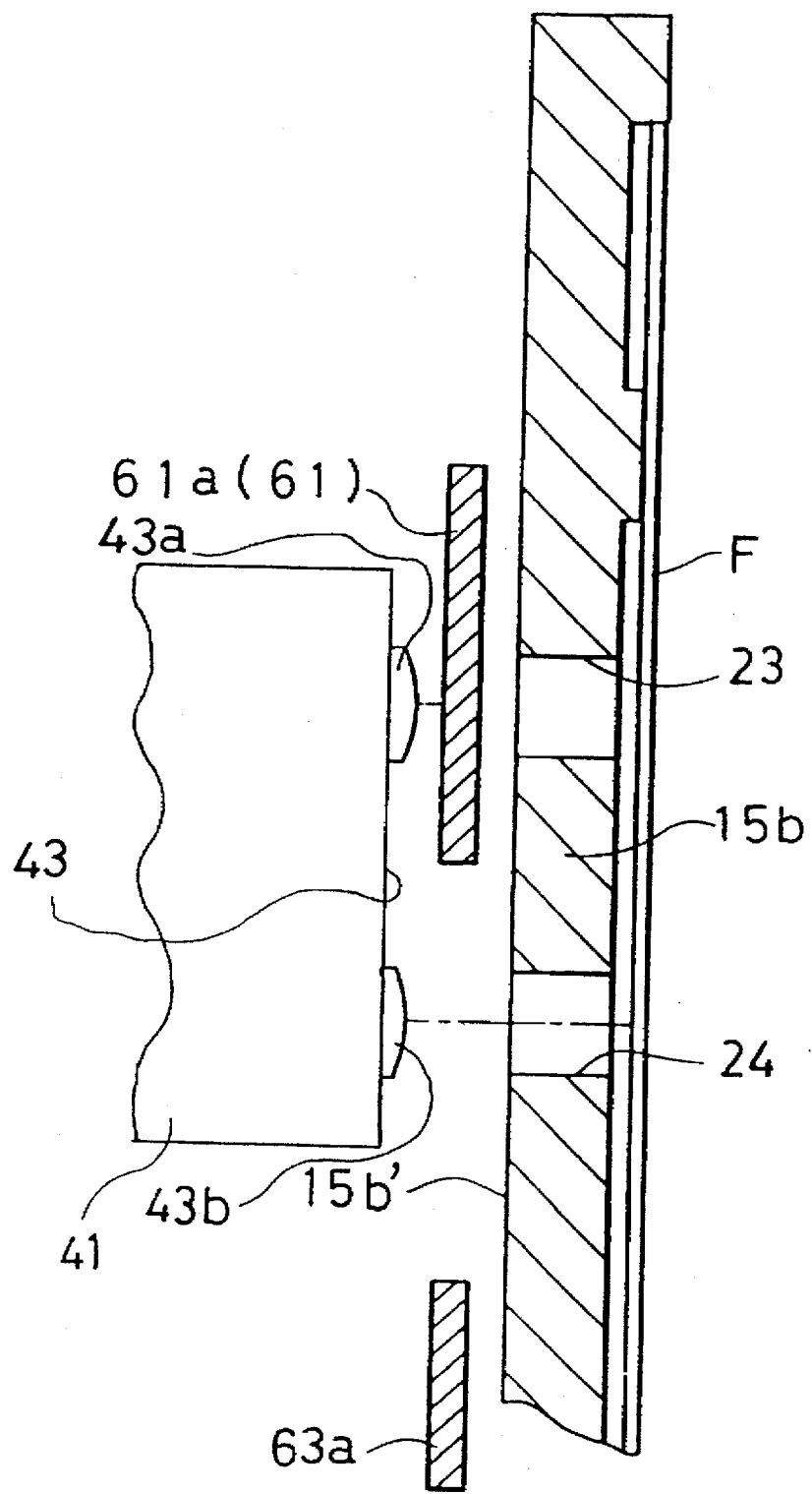
FIG. 6 is an enlarged sectional view of a main part of the data recording apparatus shown in a position different from FIG. 5.

The light intercepting plate 61 is provided on the end close to the spool compartment 13, with a generally L-shaped arm 63 integral therewith, which extends toward the light intercepting plate 62. The arm 63 is provided on the lower end thereof with a first light intercepting portion 63a which is bent and extends toward the aperture 16. The first light intercepting plate 63a is retractably moved into the light path defined between the front surface 15b' of the aperture frame 15b and the lens surface 43b of the prism 41, as shown in FIGS. 5 and 6. Namely, the first light intercepting portion 63a is located between the hole 24 and the lens surface 43b when the light intercepting plate 61 is in the standard size position, as shown in FIG. 5; and is retracted downward therefrom when the light intercepting plate 61 is in the panoramic size position, as shown in FIG. 6.

The portion of the light intercepting plate 61 that is located adjacent to the arm 63 forms a second light intercepting portion 61a which is retracted upward from the light path defined between the hole 23 and the lens surface 43a, as shown in FIG. 5 when the light intercepting plate 61 is in the standard size position. The second light intercepting portion 61a is located in the light path defined between the hole 23 and the lens surface 43a, as shown in FIG. 6 when the light intercepting plate 61 is in the panoramic size position.

Consequently, the two split identical upper and lower pattern lights, emitted from the single data module 38 can be made incident upon the film F at different recording positions corresponding to the holes 23 and 24 in accordance with the movement of the film F upon completion of the photographing operation for one frame of the film. Note that in practice, only one of the upper and lower pattern lights reaches the film F through the hole 23 or 24, depending on the selected picture plane size.

In a recent camera in which recording area data is recorded on the film without changing the area of the film to be exposed upon switching the picture plane size, as mentioned above, the light intercepting plates 61 and 62 are not necessary to partially close the aperture 16, and the light intercepting portions 61a and 63a are only provided to selectively cover the holes 23 and 24.

The camera 10 as constructed above operates as follows:

When a picture for one frame is taken, photographic data at that time, such as F-number, shutter speed or photographing data, etc., are stored in the data storing circuit 52. Thereafter, when the film F is wound, the counter roller 53 rotates in synchronization with the movement of the film F, so that the pulse generator 51 generates pulses. The controller 50 causes the LED's 37 to emit light at a predetermined timing in accordance with the pulses generated by the pulse generator 51 and the photographic data stored in the data storing circuit 52, so that a matrix pattern of light which represents the photographic data is made incident upon the film F through the mirror 40, the prism 41, and the hole 23 (or hole 24). The emission timing is controlled by the controller 50, so that the photographic data is appropriately recorded on the film F at the right end of the picture plane, depending on the length of the photographic data.

Figure 4:
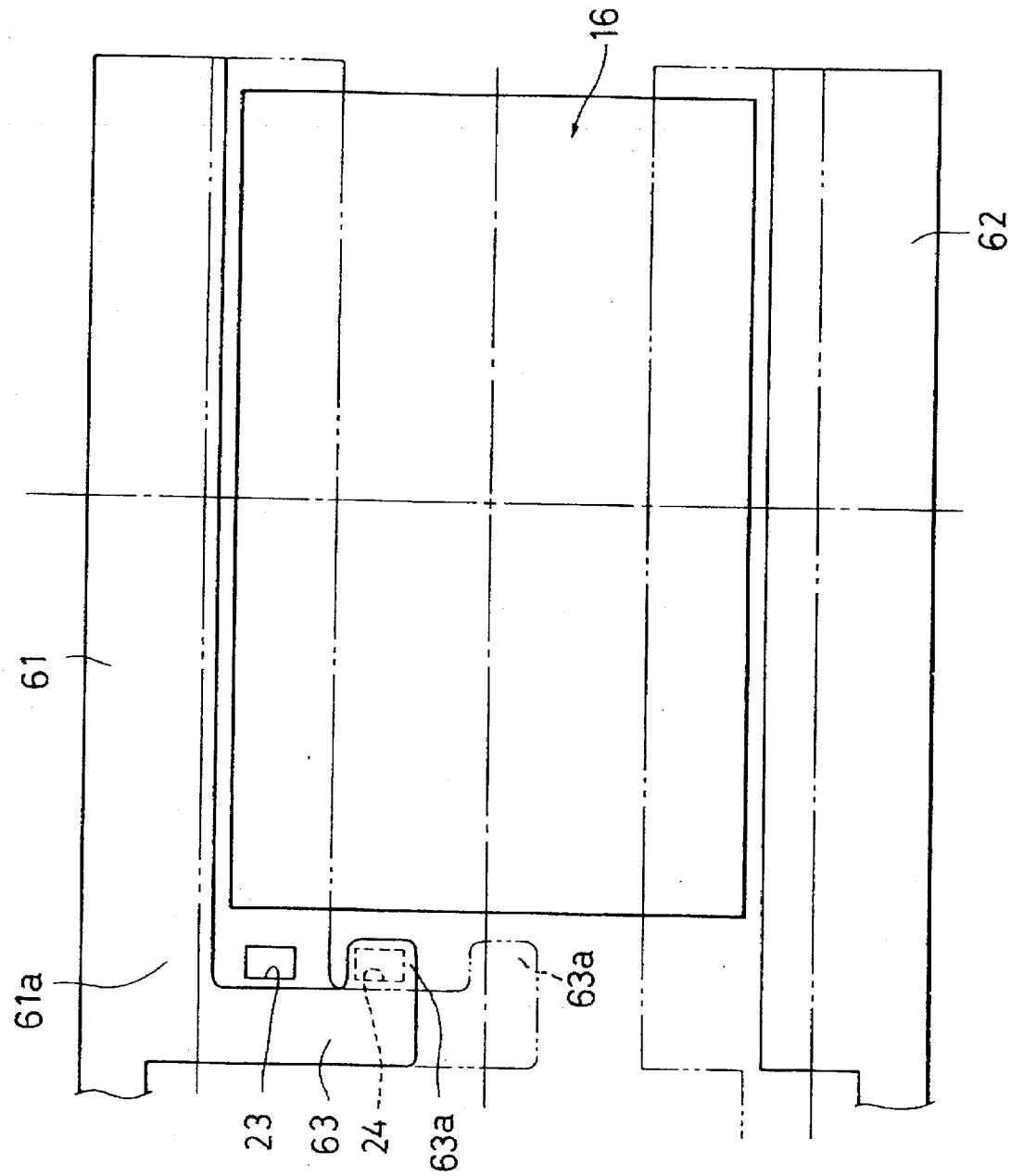
FIG. 4 is a schematic front elevational view of a light interceptor and components in the vicinity of an aperture.

Upon recording the photographic data, if the standard picture plane is selected, the first light intercepting portion 63a is inserted between the lens surface 43b and the hole 24, and the second light intercepting portion 61a is retracted from the light path defined between the lens surface 43a and the hole 23, as shown in FIGS. 4 and 5. Consequently, the light which would otherwise reach the film F through the lens surface 43b and the hole 24 is intercepted by the first light intercepting portion 63a. Namely, only the light passing through the lens surface 43a and the hole 23 reaches the film F. Thus, when the standard picture plane is selected, the photographic data is recorded on the film F at an appropriate recording position of the picture plane of the standard size (lower right corner of a print).

Conversely, if the panoramic picture plane is selected, the first light intercepting portion 63a is retracted from the light path defined between the lens surface 43b and the hole 24, and the second light intercepting portion 61a is inserted in the light path defined between the lens surface 43a and the hole 23, as shown in FIGS. 4 and 6. Consequently, the light which would otherwise reach the film F through the lens surface 43a and the hole 23 is intercepted by the second light intercepting portion 61a. Namely, only the light passing through the lens surface 43b and the hole 24 reaches the film F. Thus, when the standard picture plane is selected, the photographic data is recorded on the film F at an appropriate recording position of the picture plane of the panoramic size (lower right corner of a print).

Figure 8:
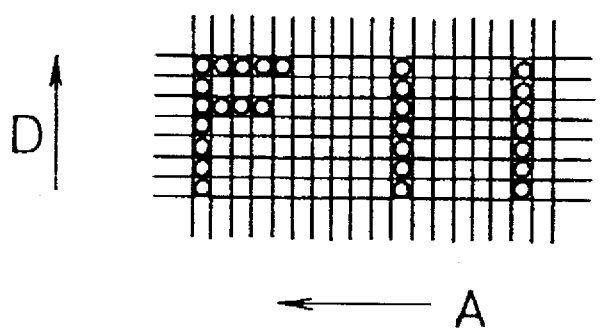

FIG. 8 shows an example of recorded data (matrix pattern) which represents "F11" formed by seven LED's 37 in a matrix pattern in which the abscissa represents the direction A of the movement of the film F and the ordinate represents the dot data defined by the selectively activated LED's.

In the first embodiment of the present invention discussed above, since the single prism 41 is commonly used to a plurality of photographing optical systems to obtain split bundles of light emitted from the data module 38 to be made incident upon the film F at different recording positions, i.e., the first image forming optical system comprised of the lens surface 42a, the prism surface 44, and the lens surface 43a, and the second image forming optical system comprised of the lens surface 42b, the prism surface 44, and the lens surface 43b, not only can the number of the optical components and the accommodation space therefor be reduced but also the assembling operation can be simplified.

Moreover, since the lens surfaces 42a and 42b and the corresponding lens surfaces 43a and 43b are integrally formed on the incident surface 42 and the emission surface 43 of the same prism 42, a predetermined pattern of light emitted from the data module 38 can be formed on the film F at a desired magnification depending on the selected picture plane size.

The mirror 40 and the prism 41 can be made integral to reduce the number of separate optical elements of the data recording apparatus. In this alternative, no adjustment of the relative position between the prism 41 and the mirror 40 is necessary.

The prism 41 in the illustrated embodiment has two image forming optical functions to make light emitted from the data module 38 incident upon the film F. If more than two bundles of light (images) are to be formed on the film at more than two different recording positions, the prism 41 is constructed to have three or more image forming optical functions.

Since the substrate 36 on which the data module 38 is mounted is secured to the spool compartment forming mold half 30 at the front end of the data recording light path 35, in the modified embodiment of the present invention, it is not necessary to provide a space for accommodating the substrate 36 in the vicinity of the aperture 16 where there is no room. This makes it possible to incorporate the data recording apparatus in a camera 10 without increasing the size of the camera.

Furthermore, since the pattern of light emitted from the data module 38 is refracted more than once by a plurality of reflecting surfaces, i.e., the mirror 40 and the prism 41 within the data recording light path 35, it is possible to reduce the width of the data recording light path 35 while ensuring the incidence of the light upon the film F at a predetermined position thereof. Hence, the interior of the camera can be further reduced.

Although the above discussion has been directed to a camera having two picture frame sizes such as a standard size and a panoramic size, the present invention can be equally applied to a camera having three or more picture plane sizes including, for example, an additional intermediate picture plane size.

I claim:

1. A data recording apparatus for a camera, comprising:
    a data module having a plurality of light emitting elements; and
    a plurality of image forming optical systems which form images of bundles of light emitted from said data module on a film at different recording positions;
    said plurality of image forming optical systems comprising a single prism to refract light paths of said bundles of light, said single prism being common to each of said plurality of image forming optical systems, said single prism comprises an incident surface for each of said plurality of image forming optical systems, said incident surface for each of said plurality of image forming optical systems being spaced equal distances from said light emitting module, and an emission surface for each of said plurality of image forming optical systems, said emission surface for each of said plurality of image forming optical systems being spaced equal distances from the film on which said images are formed by said plurality of image forming optical systems.

2. A data recording apparatus for a camera, according to claim 1, wherein pairs of each of said plurality of said first and second lens surfaces form different magnifications of images of said bundles of light emitted from said data module on said film at different recording positions.

3. A data recording apparatus for a camera, according to claim 1, further comprising selecting means for selecting one of said plurality of image forming optical systems.

4. A data recording apparatus for a camera, according to claim 3, wherein said selecting means selectively opens a light path for a selected image forming optical system and intercepts at least one light path for at least one remaining image forming optical system.

5. A data recording apparatus for a camera, according to claim 1, wherein said plurality of image forming optical systems comprises a plurality of lens surfaces integrally formed on said single prism to form individual images of the bundles of light emitted from the data module on said film, and a plurality of holes corresponding to said plurality of lens surfaces and formed in an aperture frame of said camera.

6. The data recording apparatus for a camera according to claim 1, said single prism further comprising a single planar reflecting surface, bundles of light incident upon each of said incident lens surface being reflected by said single reflecting surface and being emitted by said emission surface.

7. The data recording apparatus for a camera according to claim 1, said single prism being fixedly positioned within the camera.

8. The data recording apparatus for a camera according to claim 1, angles of incidence on said incident surface, of bundles of light of each of said plurality of image forming optical systems, emitted by said plurality of light emitting elements of said data module, being equal.

9. The data recording apparatus for a camera according to claim 1, angles of emission of bundles of light of each of said plurality of image forming optical systems, emitted from said emission surface being equal.

10. The data recording apparatus for a camera according to claim 1, said plurality of image forming optical systems further comprising a reflecting surface positioned intermediate said plurality of light emitting elements and said incident surface of said single prism.

11. The data recording apparatus according to claim 1, a plurality of first lens surfaces integral with said incident surface and a plurality of second lens surfaces integral with said emission surface.

12. A data recording apparatus for a camera with a spool compartment, comprising:
    a data module having a plurality of light emitting elements;
    image forming optical systems which form images of bundles of light from said data module on a film; and
    a data recording light path defined within said camera, a portion of said data recording light path, extending between said plurality of light emitting elements and said image forming optical systems, extending substantially in parallel with an optical axis of said camera, said data recording light path defined between said spool compartment of said camera and a photographing light path of said camera;
    wherein said data recording light path partially faces said film surface at one end, and wherein said data module is located at another end of said data recording light path.

13. A data recording apparatus for a camera, according to claim 12, further comprising a plurality of refracting surfaces in said data recording light path to refract an optical path of said image forming optical systems.

14. The data recording apparatus for a camera according to claim 12, said plurality of image forming optical systems comprising a single prism, said single prism comprising a reflecting surface, and a further reflecting surface being provided between said light emitting elements and said plurality image forming optical systems.

15. A data recording apparatus for a camera, comprising:
    a single data module having a plurality of light emitting elements;
    a plurality of image forming optical systems which form images of bundles of light emitted from said data module on a film at different recording positions, said plurality of image forming optical systems comprising a common reflecting surface and a common prism having a single incident plane and a single emitting plane;

light intercepting means provided for each of said plurality of image forming optical systems for selectively intercepting light paths defined between said data module and said film; and selecting means for selectively opening a light path for a selected light intercepting means and closing at least one light path for at least one remaining light intercepting means.

16. The data recording apparatus for a camera according to claim 15, angles of incidence of bundles of light of each of said plurality of image forming optical systems on said incident plane being equal, and angles of emission of said bundles of light of each of said plurality of image forming optical systems from said emitting plane being equal.

17. The data recording apparatus for a camera according to claim 15, each of said single incident plane and said single emitting plane having incident and emitting lens surfaces formed thereon for each of said plurality of image forming optical systems.

18. A data recording apparatus for a camera, comprising:

a data module having a plurality of light emitting elements;

a plurality of image forming optical systems that form images transmitted by light emitted from said data module on a film at different recording positions;

said plurality of image forming optical systems comprising a single prism, said single prism being common to each of said plurality of image forming optical systems, said single prism comprising an incident surface and an emission surface;

wherein said incident surface of said single prism is positioned such that light for each of said plurality of image forming optical systems is incident on said incident surface; and wherein said emission surface of said single prism is positioned such that light for each of said plurality of image forming optical systems is emitted from said emission surface at a same angle.

19. The data recording apparatus for a camera according to claim 18, a plurality of first lens surfaces being provided on said incident surface of said single prism, a plurality of second lens surfaces being provided on said emission surface of said single prism, said emission surface extending in a plane parallel to a plane of the film.

20. The data recording apparatus for a camera according to claim 18, a light path of light emitted from said data module and a light path of light incident on the film being parallel to each other.

21. The data recording apparatus for a camera according to claim 18, said incident surface comprising a plurality of first lens surfaces, said emission surface comprising a plurality of second lens surfaces, light for each of said plurality of image forming optical systems being incident on each of said plurality of first lens surfaces at a same angle and light for each of said plurality of image forming optical systems being emitted from each of said plurality of second lens surfaces at a same angle.

22. The data recording apparatus for a camera according to claim 21, distances between said plurality of light emitting elements and said plurality of first lens surfaces being equal and distances between said second plurality of lens surfaces and said film being equal.

23. The data recording apparatus for a camera according to claim 21, each of said plurality of first and second lens surfaces form different magnifications of images of light emitted from said data module on said film at different recording positions.

24. The data recording apparatus for a camera according to claim 18, further comprising means for selecting one of said plurality of image forming optical systems.

25. The data recording apparatus for a camera according to claim 18, said selecting means selectively opening a light path for one of said plurality of image forming optical systems and closing a light path for at least one of said remaining image forming optical systems.

* * * * *